United States Patent [19]
Baker et al.

[11] 4,288,175
[45] Sep. 8, 1981

[54] RETICULATELY REINFORCED EARTHEN DAMS AND METHOD FOR PROVIDING REINFORCEMENT

[75] Inventors: Leroy E. Baker; Barry L. Butterfield, both of Omaha, Nebr.

[73] Assignee: Henningson, Durham & Richardson, Inc., Omaha, Nebr.

[21] Appl. No.: 89,024

[22] Filed: Oct. 29, 1979

[51] Int. Cl.³ ............................................... E02B 7/06
[52] U.S. Cl. ..................................... 405/117; 405/15; 405/267; 405/287
[58] Field of Search ................ 405/15, 107, 109, 116, 405/117, 267, 286, 287

[56] References Cited

U.S. PATENT DOCUMENTS

| 258,025 | 5/1882 | Crump | 405/109 |
|---|---|---|---|
| 1,905,176 | 4/1933 | Kieckhefer | 405/15 X |
| 1,997,132 | 4/1935 | Collorio | 405/109 |
| 2,863,291 | 12/1958 | Murmann | 405/114 |
| 2,911,794 | 11/1959 | Pearson | 405/287 |
| 3,188,814 | 6/1965 | Rettig | 405/109 |
| 3,269,125 | 8/1966 | Moore | 405/15 |
| 3,343,301 | 9/1967 | Adelman | 405/287 X |
| 3,431,736 | 3/1969 | Ueda | 405/267 |
| 4,080,793 | 3/1978 | Pulsifer | 405/30 |
| 4,090,363 | 5/1978 | List et al. | 405/109 |

Primary Examiner—David H. Corbin
Attorney, Agent, or Firm—George R. Nimmer

[57] ABSTRACT

The downstream side of earthen dams is provided with relatively non-erodable reticulate reinforcement so that whenever the upstream water level has exceeded dam overtopping level, the reticulately reinforced dam will resist the forces of overtopping water flow and reduce the likelihood of dam breaching and consequent valley floods. Methods of internally reticulately reinforcing existant earthen dams with a plurality of transversely extending concrete check-walls and longitudinally extending embedded concrete spacer-walls are also disclosed.

20 Claims, 10 Drawing Figures

RETICULATELY REINFORCED EARTHEN DAMS AND METHOD FOR PROVIDING REINFORCEMENT

Earthen embankments for retarding water flow are inherently vulnerable to inimical erosion on the downstream side whenever the impounded upstream reservoir of water overtops the embankment crest. The overtopping water flow tends to erode longitudinal gulleys cutting progressively deeper into the embankment downstream side which eventually breaches the embankment, causing not only severe damage to the embankment structure but also flooding of the downstream valley. The consequences of downstream flooding are particularly severe when the earthen embankment takes the relatively lofty form of an earthen dam and the upstream impounded reservoir of water is topographically elevated high above the valley-basin and receiving-channel.

A typical earthen dam type embankment is depicted in FIGS. 1 and 2 of the accompanying drawing. Earthen dam embankment 100 of the prior art typically comprises a lofty crest portion 110 located immediately forwardly of the upstream reservoir 150 of water 155, the transversely extending dam-axis 101 in FIG. 1 lying along the transversely extending (112–113) crest-top 111. 102 indicates an imaginary vertical plane intersecting crest-top 111 and dam-axis 101 immediately forwardly of reservoir 150. Downstream side 120 of typical earthen dam 100 includes a generally planar downstream-face 121 extending longitudinally (106) and also sloping downwardly and forwardly of crest-top 111, downstream-face 121 merging along transversely extending topographical level 129 with the dam toe portion 130. Face 121 has a transversely extending finite-extent between the convergent gutters 122–123 thereof. As compared to the relatively planar and steep slope of downward-face 121, toe surface 131, being the natural terrain, is of relatively uneven contour and is gentler in slope. Toe surface 131 eventually merges downstream at receiving-channel 165 and valley-basin 166. Reference characters 111A and 129A refer to co-elevational topography corresponding to dam elevations 111 and 129, respectively, and "TD" refers to the elevational difference between 111 and 129.

Conventionally, spillways e.g. 160, are utilized to maintain the upper surface 156 of impounded water 155 a prescribed "safe" distance "RD" below the dam crest-top 111. In FIGS. 1 and 2, distance "RD" is the vertical distance between spillway floor 163 and topographical elevation 111–111A. Spillway 160 at its downstream terminus 164 merges with valley 165–166. Spillways are normally adequate for maintaining the water surface 156 the prescribed distance "RD" below crest-top 111 and prevent dam overtopping, though spillways will not prevent dam overtopping if the upstream reservoir 150 is subjected to unusually heavy rainfall or other heavy rate of incoming water. Though the outflow capacity of spillways can be increased by widening the floor 163 or by increasing its height "RD", thus lessening the likelihood of dam overtopping, it is oftentimes prohibitive to do so because of economic, terrain, or land development considerations.

It is accordingly the general objective of the present invention to provide earthen embankments which are usually resistant to erosion whenever subjected to overtopping water flow. It is an ancillary general objective to provide earthen dams which are unusually resistant to erosion whenever subjected to overtopping water flow whereby the dam is less likely to breach and cause disastrous flooding of the downstream valley.

It is another objective of the present invention to provide earthen dams with reliable and economical means of markedly increasing erosion resistance to overtopping water flow, and which reliable and economical means do not necessarily aesthetically detract from the earthen dam site.

It is a further general objective to provide reliable and economic methods for providing earthen dams that are unusually resistant to erosion by overtopping water flow and which methods are amenable to the modification of existing dams as well as to the building of new dams.

With the above and other objects and advantages in view, which will become more apparent as this description proceeds, the reticulately reinforced earthen dams of the present invention generally comprises a plurality of transversely extending and longitudinally separated upright check-walls embedded into the earthen dam environment, upright check-walls within the region of the dam downstream-face being of progressively lower elevation, intervening spacer means for braceably maintaining the longitudinal spacing between consecutive check-walls and thereby also defining pocket-like stilling-basins, the spacer means being embedded into the earthen environment and being preferably terminally attached to both neighboring check-walls; and the method for making such reticulately reinforced earthen embankments preferably comprises the digging of trenches corresponding to the appropriate locations of the check-walls and spacer means, filling said trenches with concrete, and providing the hardened concrete with aesthetically attractive covering.

In the drawing, wherein like characters refer to like parts in the several views, and in which.

Figure 1:
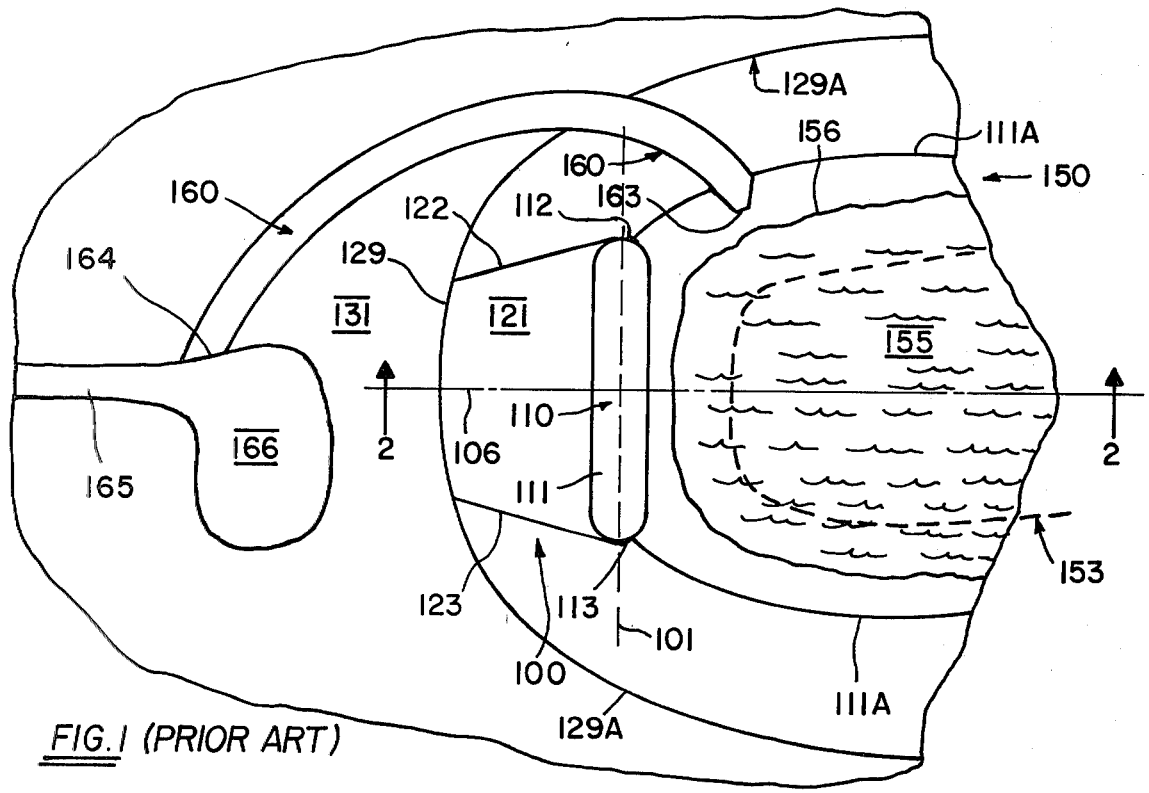
FIG. 1 is a top plan view of a typical earthen embankment of the prior art, depicted in the form of an earthen dam.
Figure 2:
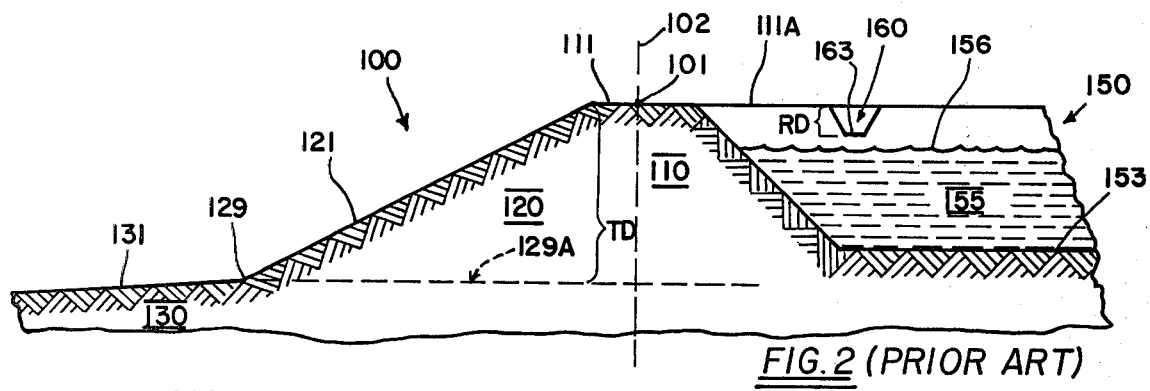
FIG. 2 is a longitudinally extending sectional elevational view taken along line 2—2 of FIG. 1.
Figure 3A:
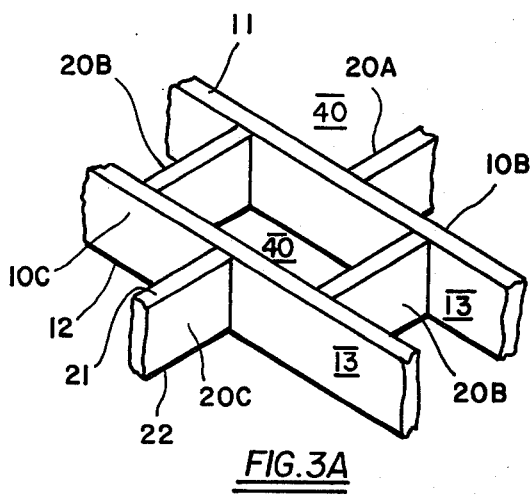
FIG. 3A is a perspective view of a representative portion of the reticulate reinforcement of FIGS. 3 and 5.
Figure 3:
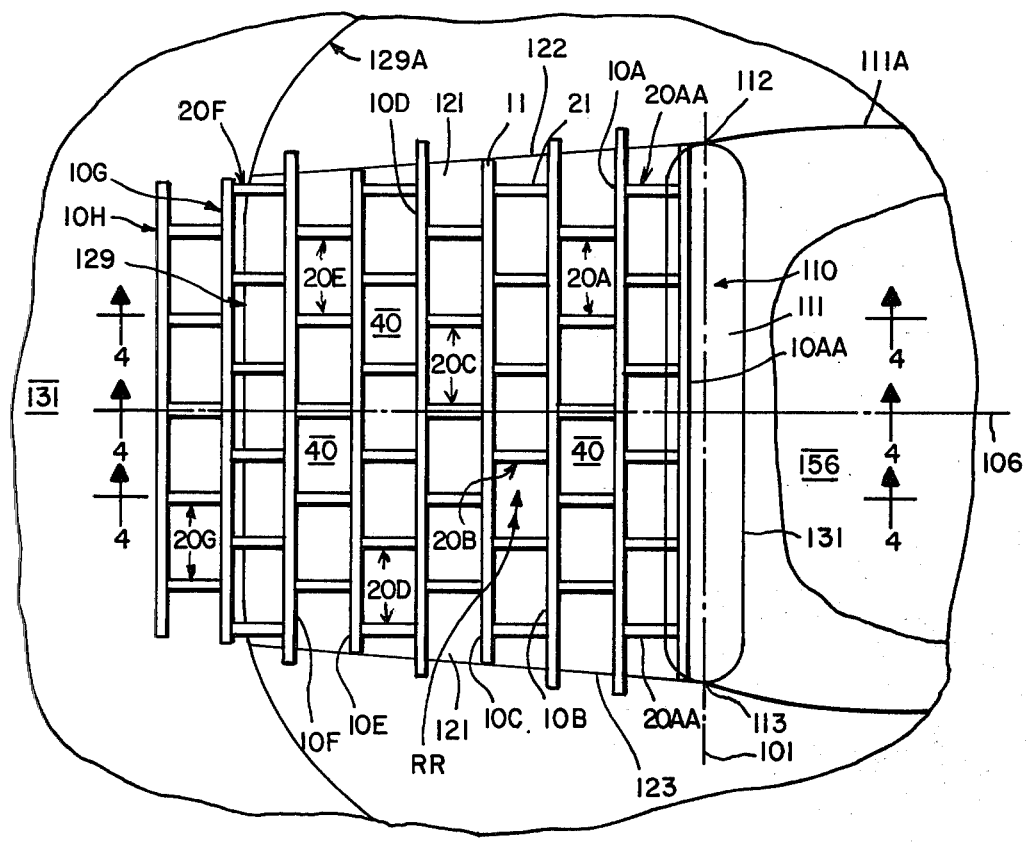
FIG. 3 is a top plan view of a representative embodiment of the reticulately reinforced earthen dams of the present invention, and based upon FIG. 1.
Figure 4:
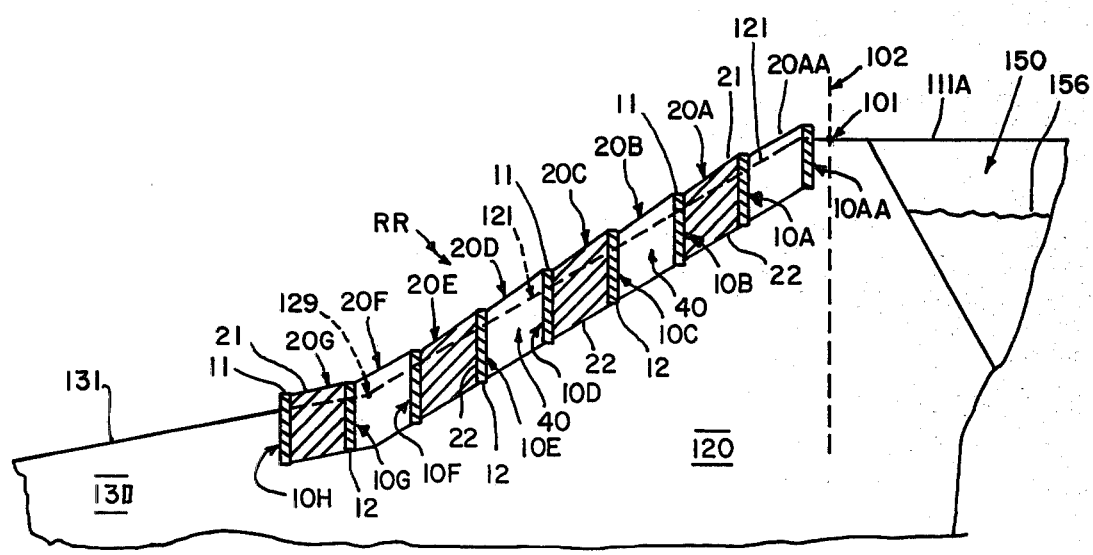
FIG. 4 is a sectional elevational view taken along lines 4—4 of FIG. 3, and based upon FIG. 2.

Turning now to FIGS. 3 and 4, which indicate the additional provision of reticulate reinforcement "RR" for the typical prior art earthen dam of FIGS. 1 and 2.

It is readily apparent from FIGS. 3, 3A, and 4, that the reticulate reinforcement "RR" is of grid-like form extending directionally both transversely (i.e. parallel to axis 101) and longitudinally (i.e. parallel to axis 106), commencing at dam crest-top 111. Preferably, the grid-like multipocketed (40) reticulate reinforcement "RR" in longitudinal direction 106 extends downwardly and forwardly of crest-top 111 to at least the transversely extending juncture 129, and in transverse extent for at least the face finite-extent 122-123.

As depicted in FIGS. 3, 3A, and 4, reticulate reinforcement "RR" comprises a plurality of transversely elongated (122-123) and longitudinally separated upright check-walls 10. Each transversely extending check-wall 10 includes: a substantially horizontal top-edge 11, respectively substantially parallel the dam-axis vertical plane 102; a substantially horizontal bottom-edge 12 deeply embedded below the surfaces e.g. 121, of the earthen dam; and upright rear-surface 14 and upright front-surface 13. Surfaces 13 and 14 are preferably parallel to each other e.g. planar, and to the vertical plane 102. Top-edge 11 together with bottom-edge 12 define the check-wall upright height 11-12; in the preferred relationship wherein edges 11 and 12 are substantially parallel, each check-wall has some regular wall-height 11-12.

Letter suffixes are herein added to reference character 10 so as to precisely identify sequential relationships among the various transversely extending check-walls. Thus, reference characters 10AA, 10A, 10B, 10C, 10D, 10E, 10F, 10G, and 10H indicate nine such longitudinally separated upright check-walls 10. Preferably, there is a substantially regular longitudinal spacing between the several check-walls within the region of downstream-face 121, for example, the check-walls 10A-10F. Moreover, within the region of dam downstream-face 121, the check-walls are of progressively lower elevation whereby the top-edge 11 of an immediately forward check-wall has an elevation intermediate edges 11 and 12 of the rearwardly neighboring check-wall. In this regard, edges 11 and 12 are desireably substantially parallel the immediately adjacent respective dam surfaces 11, 121, and 131. Thus, as indicated in FIG. 4, the reticulate reinforcement "RR" might have one or more distinct change in slope e.g. such as at check-wall 10G.

There is a plurality of intervening spacer means e.g. 20, located between and attached to neighboring check-walls 10, for braceably maintaining the longitudinal spacing between the check-walls. The respective spacer means are at least partially embedded into the earthen dam and in concert with the check-walls provide a plurality of pocket-like stilling-basins 40 within reticulate reinforcement "RR". It can now be appreciated that if the water level 156 should exceed crest 111 and the dam is overtopped, dam erosion is resisted by the presence of reticulate reinforcement "RR". Specifically, by virtue of the numerous pocket-like stilling-basins 40 and the braced (20) longitudinal spacing between the check-walls 10, overtopping water flow tends to be distributed transversely widely across the entire downstream-face 121, rather than being permitted to cut deep and relatively narrow gulleys through the dam crest 110 and downstream side 120 which would erodably deteriorate the dam and cause downstream flooding.

Figure 4A:
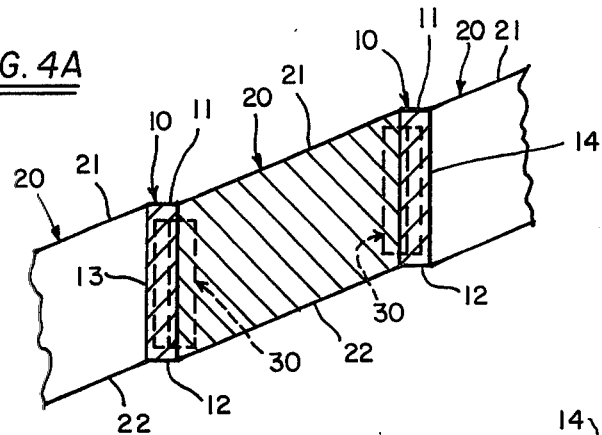
FIG. 4A is a detail view of FIGS. 4 and 6, showing in particular a preferred means for attaching check-walls to spacer-walls.

The respective spacer means are desireably substantially parallel the dam longitudinal-axis 106, whereby the pocket-like openings 40 are of tetragonal or rectangular shape in plan view. Preferably, the respective spacer means take the form of upright spacer-walls which are attached to neighboring check-walls. For example, the longitudinally (106) extending and transversely separated spacer-walls 20 might be of concrete structural material cohesively attached to concrete check-walls 10. In addition, as alluded to in FIG. 4A, internal anchoring means 30 might be utilized to enhance secure attachment between members 10 and 20. It will be noted from FIG. 3 that the transverse distance between neighboring spacer-walls 20 exceeds the longitudinal distance between neighboring check-walls 10 whereby the pocket-like stilling-basins 40 are of elongated shape in the transverse direction.

Analagously as for check-walls 10, each spacer-wall 20 might include the following longitudinally extending surfaces; a substantially horizontal upper-edge 21, a substantially horizontal lower-edge 22 deeply embedded into the earthen dam, and upright broad leftward and rightward surfaces. Upper-edge 21 defines together with lower-edge 22 a spacer-wall upright height 21-22 which exceeds one-half and preferably closely approximates the check-wall upright height 11-12. Inasmuch as the check-walls 10 within the region of downstream-face 121 are of progressively lower elevation, the respective spacer-walls 20 thereat extend downwardly and forwardly from each check-wall, upper-edges 21 analagous to top-edges 11 being substantially parallel to downstream-face 121. Letter suffixes are herein employed with reference characters 20 to precisely identify transversely aligned sets of longitudinally extending spacer-walls e.g. sets 20AA, 20A, 20B, 20C, 20D, 20E, 20F, and 20G. Though each lineal spacer-wall 20 might conceivably intersect three or more check-walls, preferably short length spacer-walls are utilized with the two upright ends 23 and 24 terminally abutting and attached to neighboring check-walls. For example, each of the transversely separated spacer-walls within set 20B terminally abuts and is attached to a check-wall 10B and to a check-wall 10C. In this vein, longitudinally consecutive spacer-walls e.g. 20B and 20C, 20C and 20D, etc., are in non-aligned or staggered relationship. However, every other spacer-wall e.g. 20B and 20D, 20C and 20E, etc., might be linearly aligned for further enhancing the overall strength of grid-like reinforcement "RR".

Figure 5:
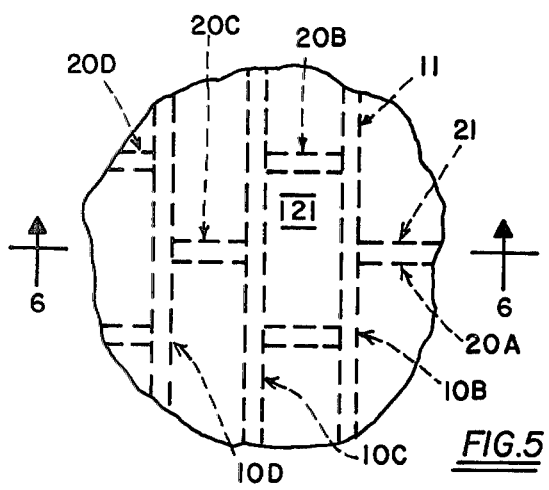
FIG. 5 is a top plan view similar to FIG. 3 indicating that the reticulate reinforcement might be aesthetically covered and obscured from view.
Figure 6:
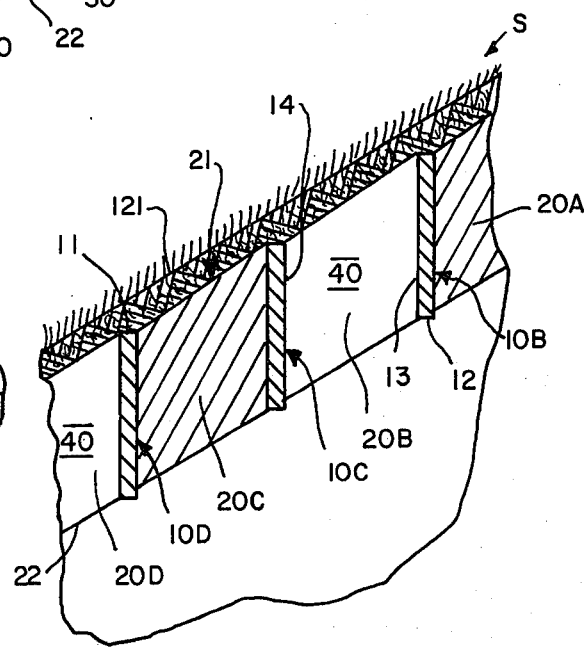
FIG. 6 is a sectional elevational view similar to FIG. 4 taken along line 6—6 of FIG. 5.

As indicated in FIGS. 5 and 6, the reticulate reinforcement "RR" might be covered with soil, pebbles, etc., or otherwise obscured from view, in order to enhance the aesthetic appearance of the reticulately reinforced earthen embankment. The pocket-like stilling-basins 40 might be filled with soil thereby restoring the entire downstream-face 121 but without detracting from the ability of the pocketed (40) reinforcement "RR" to resist dam erosion by overtopping water flow. Moreover, the restored surface 121 might be planted with grass or other growing vegetation "S", the reinforcement upper extremities 11 and 21 being substantially parallel to surface 121 and recessed below the root zone of growing vegetation "S".

Figure 7:
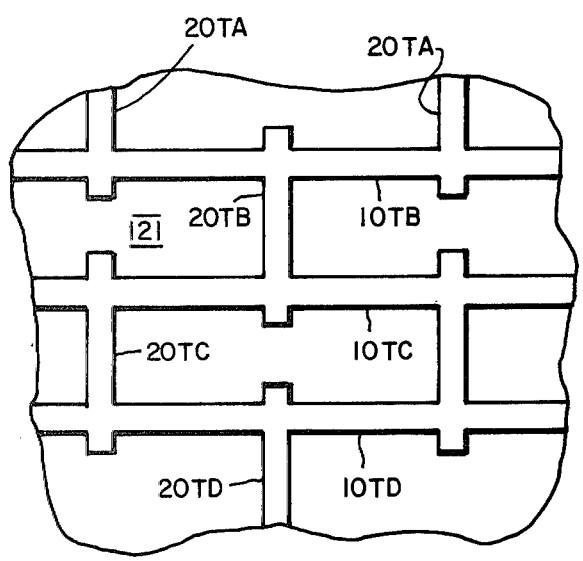
FIG. 7 is a top plan view similar to FIGS. 3 and 5 and relating to a preferred method for making the reticulately reinforced earthen dam.
Figure 8:
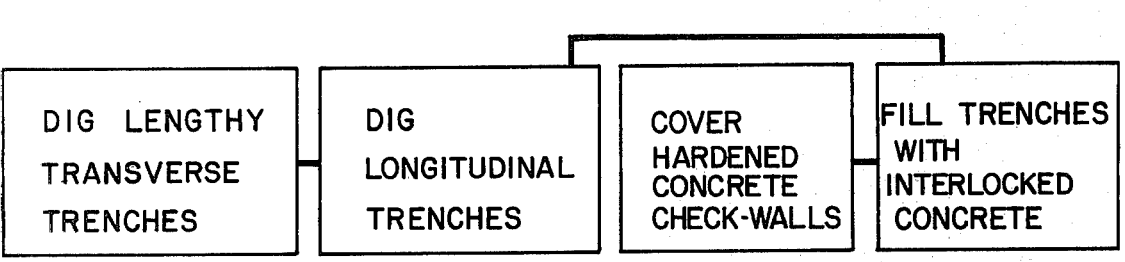
FIG. 8 is a flow diagram alluding to the preferred method for making the reticulately reinforced earthen dams.

FIGS. 7 and 8 allude to preferred method steps for making the earthen dam reticulate reinforcement "RR" wherein the check-walls 10 and spacer-walls 20 are made by pouring concrete into intersecting trenches 10T and 20T dug into the earthen dam 100. The length, width, and spacing of the trenches 10T and 20T, and the concrete pour height, determine length, width and height of check-walls 10 and spacer-walls 20; the area, depth, and shape of stilling-basins 40 are coincidentally defined thereby. If the spacer-walls 20 are to be staggered, the initial step should be to dig transversely extending and elongated (e.g. 122–123) check-trenches 10T, using either manual labor or a trenching machine. Because the respective check-walls 10 and stilling-basins 40 must transversely distribute the flow of overtopping water, each check-wall 10 should be substantially free of gaps or other water pervious structural discontinuity. Thus, check-trenches 10T and resultant check-walls 10 of continuous uninterrupted length are ideal; but at least, the number of gaps for any one check-wall e.g. 10A, 10B, etc., should be less than the number of stilling-basins 40 defined by its upright frontal length 13. Then, the longitudinally extending and desireably shorter length spacer-trenches 20T are dug, thus providing a trenching pattern suggested in FIG. 7. Next, concrete is poured into the pattern of intersecting trenches e.g. as in FIG. 7, the inter-walls anchoring or interlocking means 30 being inserted prior to the concrete being hardened into walls 10 and 20. Assuming the arbitrary decision is made that concrete be poured to a level somewhat below the dam surfaces 111, 121, and 131, the wall upper extremities 11 and 21 can be covered with soil, pebbles, growing vegetation, etc. Accordingly, the internally reticulately reinforced dam need not differ in external appearance from a prior art dam e.g. that of FIGS. 1 and 2.

From the foregoing, the construction and utility of the reticulately reinforced earthen dams and methods for constructing them will be readily understood and further explanation is believed to be unnecessary. However, since numerous modifications and changes will readily occur to those skilled in the art, it is not desired to limit the invention to the exact construction and method shown and described, and accordingly, all suitable modifications and equivalents may be resorted to, falling within the scope of the appended claims.

We claim:

1. In an earthen dam comprising a lofty crest located immediately forwardly a water reservoir and including a crest-top transversely extending along a dam-axis, a downstream side including a substantially planar downstream-face sloping longitudinally forwardly and downwardly from said crest-top and having a transversely extending finite-extent defined by downstream-face gutters, and a dam toe portion including a toe-surface at the natural terrain, the improvement of reticulate dam reinforcement commencing at the crest-top and extending longitudinally downwardly therefrom and also extending generally parallel thereto for at least said finite-extent, said reinforcement being indefinitely thereafter capable of preventing breach of the earthen dam during overtopping by water flood flows and comprising:

A. a plurality of transversely extending and longitudinally separated upright check-walls and each check-wall including:
  i. opposed transversely extending upright rear-surface and front-surface,
  ii. a transversely extending bottom-edge embedded into the earthen dam, the bottom-edges of the check-walls being substantially parallel to each other and to a vertical plane passing through the dam axis, and
  iii. a transversely extending substantially horizontal top-edge and defining with said bottom-edge an upright height, the check-walls top-edges being substantially horizontal and parallel to each other and to a vertical plane passing through said dam-axis; the majority of said check-walls at their top-edges being recessed below the adjacent surfaces of the earthen dam; the longitudinally separated consecutive check-walls within the region of the dam downstream-face being of progressively lower elevation whereby the top-edge of an immediately forward upright check-wall has an elevation between the top-edge and bottom-edge of the rearwardly neighboring check-wall; and B. a plurality of intervening longitudinally, extending spacer-walls located between and attached to consecutively neighboring check-walls and for braceably maintaining the longitudinal spacing therebetween, each of said spacer-walls having an upper-edge and a lower-edge, said spacer-walls providing in concert with the check-walls a plurality of tetragonal pocket-like stilling-basins for said dam reinforcement, said spacer-walls being at least partially embedded into the earthen dam and the majority of said spacer-walls at their upper-edges being recessed below the adjacent surfaces of the earthen dam.

2. The structure of claim 1 wherein the majority of said pocket-like stilling basins are substantially filled with the earthen dam structural material, said check-walls and spacer-walls defining said stilling-basins being of concrete and markedly resistant to physical deterioration by the earthen dam structural material.

3. The reticulately reinforced structure of claim 2 wherein the reticulate reinforcement extends downwardly and form from the crest-top to at least the transversely extending juncture downstream-face and toe-surface.

4. The structure of claim 3 wherein the majority of said check-walls subsurface top-edges are substantially parallel the immediately adjacent surfaces of the earthen dam and covered thereby.

5. The structure of claim 4 wherein the covering includes growing vegetation, the check-walls being located below the root zone of said growing vegetation.

6. The structure of claim 5 wherein the upright rear-surface and front-surface of the respective check-walls are substantially planar and parallel to the dam-axis vertical plane.

7. The structure of claim 5 wherein the upright rear-surface and front-surface of the respective check-walls are substantially planar and perpendicular to the plane of the dam downstream-face.

8. The reticulately reinforced structure of claim 1 wherein the majority of the check-walls have a substantially horizontal bottom-edge whereby the check-wall has a regular wall-height between top-edge and bottom-edge; and wherein the majority of the longitudinally extending spacer-walls have a regular spacer-height from upper-edge to lower-edge, the spacer-height exceeding one-half said wall-height.

9. The structure of claim 8 wherein the reticulate dam reinforcement has at least one distinct change in longitudinal slope.

10. The structure of claim 9 wherein the spacer-walls are longitudinally linear and abuttably terminally bear against the two neighboring check-walls.

11. The structure of claim 10 wherein both terminal ends of respective spacer-walls are attached to both neighboring check-walls with internal anchoring means; and wherein the pocket-like stilling-basins are substantially rectangular and transversely elongated.

12. The structure of claim 11 wherein longitudinally consecutive spacer-walls are in non-linear and transversely offset relationship.

13. The structure of claim 1 wherein the majority of said stilling-basins are substantially rectangular and filled with earthen dam material, said rectangular stilling-basins being elongated in the transverse direction.

14. The structure of claim 13 wherein the majority of said check-walls and spacer-walls are constructed of concrete material.

15. The structure of claim 14 wherein the reticulate dam reinforcement has at least one distinct change in longitudinal slope.

16. The structure of claim 15 wherein the majority of said top-edges and upper-edges are obstructed from view with aesthetically attractive covering means.

17. The method of reticulately reinforcing an existant earthen dam of the general type comprising a lofty crest located immediately forwardly a water reservoir and including a crest-top transversely extending along a dam-axis, a downstream side including a downstream-face sloping longitudinally forwardly and downwardly from said crest-top and having a transversely extending finite-extent, said dam reinforcement method comprising the following steps:

A. digging a series of transversely elongated and longitudinally separated upright check-trenches into the crest-top and downstream-face of the earthen dam;

B. digging a series of longitudinally extending and transversely separated upright spacer-trenches into the crest-top and downstream face whereby spacer-trenches slope directionally longitudinally, each spacer-trench intersecting at least two consecutive check-trenches;

C. pouring hardenable concrete into the check-trenches to provide check-walls upon hardening; and D. pouring hardenable concrete into the spacer-trenches to provide spacer-walls upon hardening of said poured concrete.

18. The method of claim 17 wherein longitudinally consecutive spacer-trenches are dug in non-linearly and transversely offset relationship whereby consecutive longitudinal spacer-walls are staggered.

19. The method of claim 18 wherein the respective check-trenches extend at least the finite-extent of the downstream-face.

20. The method of claim 17 wherein subsequent the concrete pouring steps, there is the additional step of overlaying the check-walls and the spacer-walls with aesthetically attractive covering.

* * * * *